United States Patent [19]

Allinquant et al.

[11] 4,163,970

[45] Aug. 7, 1979

[54] PNEUMATIC SPRINGS AND OTHER TELESCOPIC SYSTEMS

[76] Inventors: Fernand M. Allinquant, 53, Avenue Le Nôtre; Jacques G. Allinquant, 12, Avenue Arouet, both of 92-Sceaux, France

[21] Appl. No.: 873,888

[22] Filed: Jan. 31, 1978

Related U.S. Application Data

[62] Division of Ser. No. 689,603, May 24, 1976, Pat. No. 4,089,512.

[30] Foreign Application Priority Data

May 23, 1975 [FR] France .................................. 75 16138
Dec. 15, 1975 [FR] France .................................. 75 38295

[51] Int. Cl.² ........................ H01H 3/16; G08B 21/00
[52] U.S. Cl. ................................ 340/686; 200/61.62; 188/1 A

[58] Field of Search .................... 200/61.62, 52 R; 340/686; 92/5 R; 188/7 A; 267/65 R, 65 D; 280/707

[56] References Cited

U.S. PATENT DOCUMENTS 3,919,509  11/1975  Schnitzius ...................... 200/61.62

*Primary Examiner*—James R. Scott
*Attorney, Agent, or Firm*—Staas & Halsey

[57] ABSTRACT

A telescopic system formed of a relatively slidable plunger rod and cylinder is operated as a pneumatic spring equipped with an end-stroke electrically-actuated indicator. The plunger rod is fitted with a damping piston which is slidably mounted thereon between two stops secured thereto and used as valve members for partially obturating a groove formed on the piston face and communicating with an axial passage through the piston. The cylinder bottom and the slidable piston constitute the two associated contacts of an electric switch and are respectively connected to the terminals of an electric circuit energizing an indicator.

4 Claims, 5 Drawing Figures

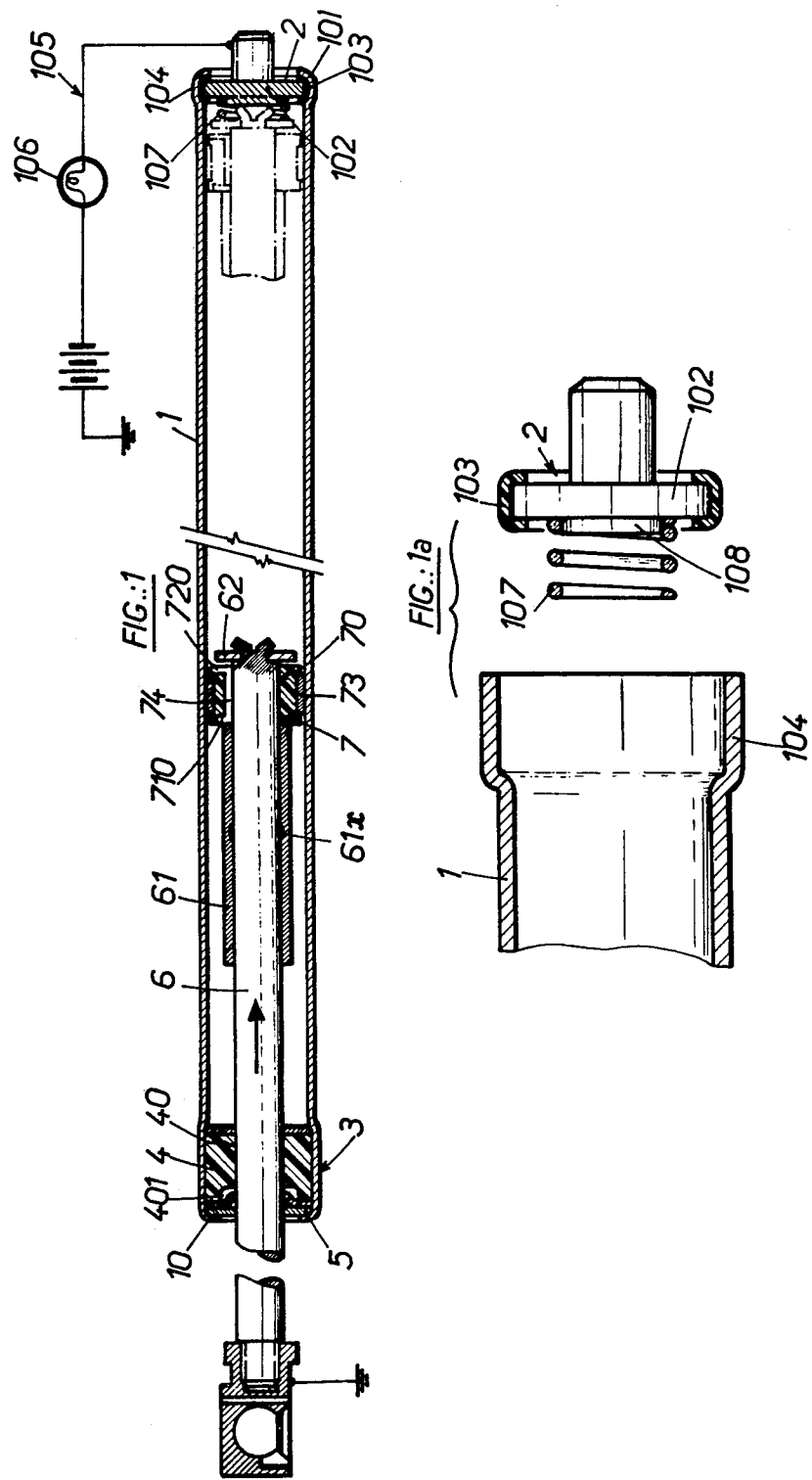

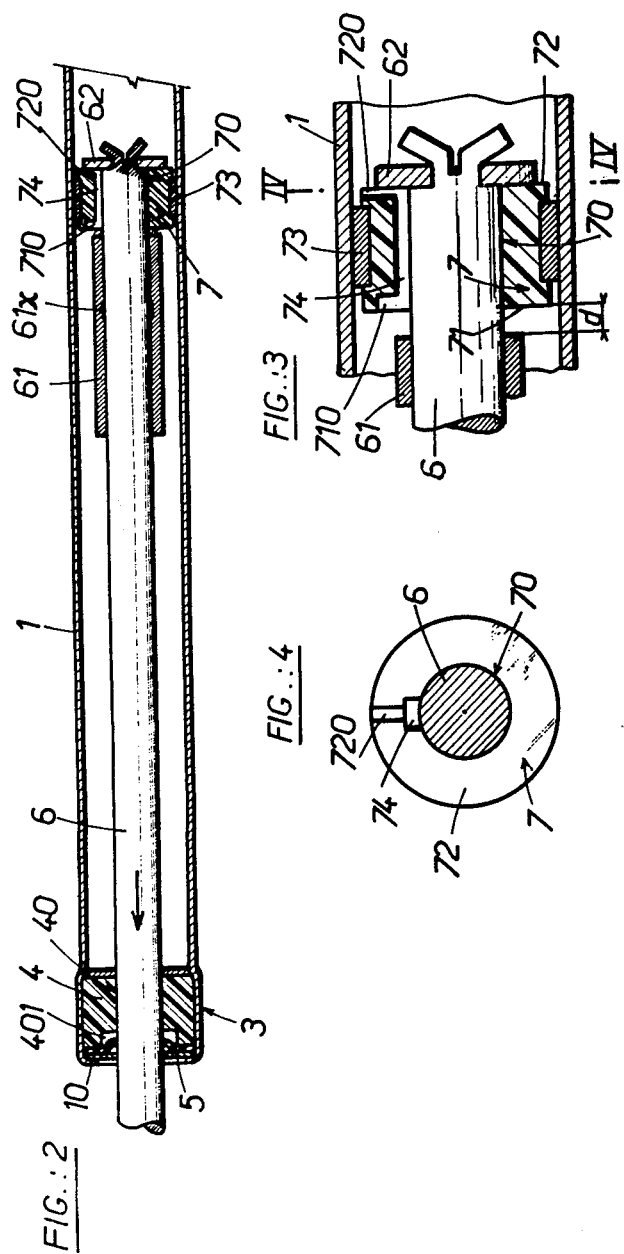

PNEUMATIC SPRINGS AND OTHER TELESCOPIC SYSTEMS

This is a division of application Ser. No. 689,603 filed May 24, 1976 now U.S. Pat. No. 4,089,512, granted May 16, 1978.

BACKGROUND AND SUMMARY OF INVENTION

Pneumatic springs have been proposed already which comprise a plunger rod entering sealingly in a cylinder with pressurized gas, and having a guiding damping piston which divides the cylinder into two chambers communicating with each other by means of an axial passage through the piston.

Damped pneumatic springs of the kind set forth can be used for opening and closing vehicles or machines bonnets, actuating doors, controlling seats or desks level, etc..

According to an object of the present invention there is provided an electrical contact device suitable for detecting the end position of a telescopic system which is a pneumatic spring such as above set forth.

According to the present invention, there is provided an electrical switch comprising a cylinder with a closed bottom end, and in which a piston is slidably mounted, this bottom and piston constituting respectively the fixed and the movable contact of the switch, being electrically insulated one from the other and connected to the terminals of an electric circuit which is either closed or broken if the piston after having moved over its whole stroke engages the bottom of the cylinder or is spaced apart from it. Such a contact could be done merely through direct engagement of the bottom by the piston; nevertheless for manufacturing tolerances and slows dampering grounds, it is better to use between them an electrically conducting flexible member such a spring acting as a resilient abutment, which may be fixed at will on the piston or on the bottom.

According to an embodiment of the present invention, the cylinder is made of a conducting material and is permanently in electrical contact with the piston, whereas the bottom, also of a conducting material is fixed to said cylinder by means of a crown of insulating material, which besides may be acting as sealing gasket for the telescopic system. Alternatively, the insulation between bottom and piston could be located over the bottom, i.e. between the bottom and the cylinder, or provided by the cylinder itself, which then would be made of insulating material, at least at its end portion adjacent to the bottom.

The above discussed electrical circuit including the switch according to the present invention, comprises preferably a signal generating member, which accordingly will be actuated by the closing of the switch, in other words the piston having achieved its stroke, the circuit acting accordingly as a end position detector of the telescopic system.

BRIEF DESCRIPTION OF THE DRAWINGS

The invention will now be further described, by way of example only, with reference to the accompanying drawings in which:

FIG. 1 is an axial cross-sectional view of a telescopic system in accordance with the invention, acting as a pneumatic spring with plunger rod and piston movable in a cylinder (the rod and the piston being shown when moving inwardly in the cylinder), and an electrical switch able to detect the inside end position of the telescopic system (the electrical circuit being schematically shown);

FIG. 1a is a cross-sectional partial axial view of the end part of the so mounted device, but before mounting and fastening of the bottom on the cylinder;

FIG. 2 is a view similar to FIG. 1, but showing the plunger rod and the piston when moving outwardly of the cylinder;

FIG. 3 is an enlarged cross-sectional axial view of the spring portion located in the piston zone;

FIG. 4 is a transversal cross-sectional view of the piston and plunger rod assembly, along line IV—IV of FIG. 3;

DESCRIPTION OF THE PREFERRED EMBODIMENT

On FIGS. 1 to 4, numeral 1 indicates a cylinder sealingly closed at an end by a bottom 2, and at the other end by a closing assembly 3. This assembly comprises on one hand a plug 4 sealingly forced in the cylinder end and setted in that cylinder by folding back an end edge 10 of the cylinder, and on the other hand a mechanical seal 5 provided with a lip, engaging with one face the external face of the plug. The plug 4 is formed with a bore 40 entered sealingly by a plunger rod 6. The plug 4 is made of "Nylon, Teflon, Rilsan" (registered trademarks) or other strong polymeric insulating substance with a low friction coefficient allowing easy sliding of steel rod 6.

The thus designed impervious cylinder, which is also made of steel is filled up with a pressurized gas, preferably an inert gas such as nitrogen for preventing all bursting risk. The pressure in the cylinder may be of several ten $kg/cm^3$ or so.

During the plunger rod entering the cylinder, there arise an additional pressure applied on the free end of the rod, urging the rod outside the cylinder as soon as the rod is free. It is so provided a pneumatic spring of which two essential elements are on one hand the plunger rod 6, and on the other hand the impervious cylinder 1 containing the pressurized gas.

In the area of its free end, the plunger rod 6 is fitted with a piston 7 comprising a thick washer in Nylon or other strong and insulating polymeric material, having two annular end faces 71, 72 (FIG. 3) and a central bore 70 coaxial to the plunger rod, and through which the latter is threaded. The piston 7 comprises a sealing and friction ring 73 at its periphery, allowing the piston to guide the plunger rod and to subdivide cylinder 1 into two chambers on either side of the piston.

Piston 7 is also used as a damping element for the pneumatic spring in service. To this end, as it is shown in enlarged scale on FIGS. 3 and 4, it comprises an axial passage 74 opening on both end faces 71, 72 and intercommunicating the two chambers of the cylinder. The axial passage of this embodiment as shown is achieved by a groove 74 carved in the piston and beginning from the bore 70.

At least one, but preferably each, of the annular end faces 71 and 72 of piston 7 is provided with a radial groove extending outwardly from the axial groove 74. In the illustrated embodiment, such radial grooves 710 and 720 are formed on the piston end faces 71 and 72 respectively, both radial grooves 710 and 720 extending, as stated, from axial groove 74. As shown in FIG. 3, these grooves radial are of very different depth, groove 710 in the end face 71 regarding to plunger rod 6 being the deeper.

Piston 7 is axially slidable on plunger rod 6 between two stops 61, 62 fast therewith and shown as formed each by a part different from, but locked to, the plunger rod. Stop 61 is formed e.g. by a sleeve welded or set (in 61x) on plunger rod 6, and being used simultaneously as a strut for limiting the outward stroke of the rod. Stop 62 may be made of a metallic washer fixed at the end of the rod. The axial distance between stops 61 and 62 is greater than the axial length of piston 7, so that piston 7 is allowed to move by inertia on a distance "d" (see FIG. 3) of several millimeters or so between these two stops.

When in use, as the plunger rod 6 enters cylinder 1 in the direction as shown by the arrow on FIG. 1, the gas is urged to flow from the right to the left of the piston (on the figure). Piston 7 is made loose from stop 62 and engages stop 61.

In this configuration, the opening of axial passage 74 on piston face 72 is free, whereas way out of this axial passage which is determined by radial groove 710 cut in piston face 71 is partially closed by stop 61. However, as this groove 710 is rather deep, an important area allowing the gas to flow from one chamber to the other through the piston is determined, so that this flow is not or little resisted and the balance of pressure between the two chambers is easily obtained. The damping effect of piston 7 is then weak or worthless.

This configuration corresponds to the case when the plunger rod 6 is urged to enter the cylinder with growing pressure of the gas. The only effort to exert is the compression force corresponding to the cross-section area of the rod and the pressure of the gas.

On the contrary, when the plunger rod 6 is going out of cylinder 1 in the direction of the arrow on FIG. 2, piston 6 becomes loose from stop 61 and engages stop 62. The opening of axial passage 74, now located on piston face 71 is free, whereas the way out of this passage, formed by radial groove 720 cut in piston face 72 is partially closed by stop 62. As this radial groove is of little depth, it determines for the flow of gas a reduced area, so that escaping of gas is strongly resisted. The loosening of the spring, due to the force of the pressurized gas on the cross-section area of the rod is then damped.

According to the deepness of radial grooves 710 and 720, the free area section allowing gas to flow is not the same in either direction, and consequently the damping effect of the rod entering or going out of the cylinder. A previous adjustment means is provided in this way in view of subsequent use of the pneumatic spring.

According to the present invention, such a pneumatic spring is arranged to form an electrical switch allowing the remote signalling of the fully retracted position, of the pneumatic spring.

As shown on FIGS. 1 and 1a, the closing bottom 2 of cylinder 1 is made of a metallic disc 102, the periphery of which is covered with an insulating plastic crown 103 made of a synthetic rubber mixture adhered and cured on disc 102; it is used to ensure the tightness of this cylinder end and the insulation of the metallic part 102 with respect to cylinder 1 during forced inserting in the outflaring end 104 of cylinder 1. A folded flange 101 is provided for keeping in place bottom 2.

It appears that with this construction, cylinder 1 is electrically insulated from rod 6 and bottom 2.

If such a telescopic system is inserted in an electrical circuit 105, the circuit is open so long as the end of rod 6 has not engaged the metallic bottom 102, and no electric current can flow to light lamp 106 or other signalling device, indicating the retracted position of the telescopic system.

In view of mounting conveniences, a resilient member such as a helicoidal spring 107 is provided, being tightened on a centering boss 108, provided on the metallic bottom 102: by this resilient member the desired contact is secured on the end of the compression stroke of the telescopic system.

In the appended claims, the word "piston" is used to designate the end portion of the slidable assembly, either the piston 7 itself, or the plunger rod 6 end, or the added stop 62.

We claim:

1. An extreme-position detector device for a telescopic pneumatic spring of the kind comprising a gas filled hermetic cylinder having a sealed bottom closure at one end thereof, and an assembly which is movable with respect to said cylinder and which includes a plunger rod extending gas tightly and slidably through the other end of said cylinder and into the same, and a damper piston fitted at the inner end of said plunger rod and presenting a restricted passage formed therethrough, said piston dividing said cylinder into two pressure chambers which communicate with one another through said restricted passage, wherein the improvement comprises:
means for electrically insulating said rod-and-piston assembly and said bottom closure from each other and maintaining the same in electrical out-of-contact relationship when said plunger rod is in its extreme extended position as well as throughout substantially the whole stroke of said piston in said cylinder from said extreme extended position, a source of electric current, means for electrically connecting said rod-and-piston assembly to one terminal of said source, means for electrically connecting said bottom closure to the other terminal of said source, and an electrically actuatable signalling means fitted in series with said source in the electric circuit connecting the same to said rod-and-piston assembly and bottom closure,
whereby said signalling means is actuated to indicate upon electric contact engagement between said piston and said bottom closure occurring only when said plunger rod is in its extreme retracted position within said cylinder.

2. A detector device as claimed in claim 1, wherein both said cylinder and said bottom closure are of electrically conductive material, and wherein said electrically insulating means comprises a sealing ring of electrically insulating material fitted within said cylinder and extending all around said bottom closure.

3. Detector device as claimed in claim 1, wherein both said cylinder and said rod-and piston are made of electrically conductive material, and wherein said electrically insulating means comprises a piston ring of electrically insulating material fitted around said piston and slidably engaging the wall of said cylinder.

4. Detector device as claimed in claim 1, wherein both said rod and piston assembly and said bottom closure are made of electrically conductive material, and wherein said cylinder is made of electrically insulating material.

* * * * *

UNITED STATES PATENT AND TRADEMARK OFFICE
CERTIFICATE OF CORRECTION

PATENT NO. : 4,163,970
DATED : August 7, 1979
INVENTOR(S) : FERNAND M. ALLINQUANT ET AL.

It is certified that error appears in the above-identified patent and that said Letters Patent are hereby corrected as shown below:

Col. 2, line 68, "radial" should be inserted before "grooves" and deleted after "grooves".

Signed and Sealed this

Seventeenth Day of November 1981

[SEAL]

Attest:

GERALD J. MOSSINGHOFF

Attesting Officer

Commissioner of Patents and Trademarks